United States Patent
Sorg et al.

[11] Patent Number: 5,730,677
[45] Date of Patent: Mar. 24, 1998

[54] PROTECTION DEVICE FOR A STEERING TRANSMISSION OF A TRACKED VEHICLE

[75] Inventors: Johannes Sorg, Ravensburg; Walter Loichinger, Friedrichshafen, both of Germany

[73] Assignee: ZF Friedrichshafen AG, Friedrichshafen, Germany

[21] Appl. No.: 652,428

[22] PCT Filed: Nov. 29, 1994

[86] PCT No.: PCT/EP94/03952

§ 371 Date: May 30, 1996

§ 102(e) Date: May 30, 1996

[87] PCT Pub. No.: WO95/15272

PCT Pub. Date: Jun. 8, 1995

[30] Foreign Application Priority Data

Dec. 3, 1993 [DE] Germany ............... 43 41 202.5

[51] Int. Cl.$^6$ ................................................. B62D 11/06
[52] U.S. Cl. ..................................... 475/19; 475/28
[58] Field of Search ......................... 475/18, 19, 28, 475/158; 477/1

[56] References Cited

U.S. PATENT DOCUMENTS

| 3,656,371 | 4/1972 | Schaefer | 477/1 |
| 4,309,917 | 1/1982 | Leet | 477/1 |
| 4,519,275 | 5/1985 | Maruyama et al. | 475/19 |
| 4,890,508 | 1/1990 | Zaunberger | 475/19 |
| 5,473,541 | 12/1995 | Ishino et al. | 477/1 |

FOREIGN PATENT DOCUMENTS

| 1 755 708 | 12/1971 | Germany. |
| 38 40 686 | 6/1990 | Germany. |
| WO86/07324 | 12/1986 | WIPO. |

*Primary Examiner*—Charles A. Marmor
*Assistant Examiner*—Sherry Lynn Estremsky
*Attorney, Agent, or Firm*—Davis and Bujold

[57] ABSTRACT

A protection device for a steering transmission of a tracked vehicle having a plurality of planetary gear sets capable of engaging different ratios for cornering in curves with different radii. The input and output speeds of the steering transmission and the transmission ratios are determined and compared with predetermined operating parameters in order to determine if clutch slippage is occurring. If slippage is detected, the steering transmission is thereupon temporarily disengaged.

8 Claims, 4 Drawing Sheets

| NR. | BRAKE | ENGAGED GEAR | V_VEHICLE < V_THRESHOLD | P_STEERING TRANSMISSION L5 | L6 | L7 | COMPARISON OF N_IN_STEERING TRANSMISSION N_OUT_STEERING TRANSMISSION | DISENGAGEMENT STEERING TRANSMISSION (p_L4) |
|---|---|---|---|---|---|---|---|---|
| 1 | | <>N | 1 | 1 | | | N_++_IN_STEERING TRANSMISSION N_OUT_STEERING TRANSMISSION | 1 |
| 2 | | <>N | 1 | | 1 | | N_++_IN_STEERING TRANSMISSION N_OUT_STEERING TRANSMISSION | 1 |
| 3 | | <>N | 1 | 1 | 1 | 1 | N_++_IN_STEERING TRANSMISSION N_OUT_STEERING TRANSMISSION | 1 |
| 4 | | N t > 2,5 SEC | | 1 | 1 | 1 | | 1 |
| 5 | 1 | | | 1 | | | | 1 |

BASIC FUNCTIONS

OPTIONAL FUNCTION

FIG.4

| ERROR DETECTION | | | PRESSURE SWITCH | | |
|---|---|---|---|---|---|
| WHEN: | | | THEN: | | |
| p_L6 | p_L7 | N_OUT_STEERING > K*N_IN_STEERING | p_L5 | p_L6 | p_L7 |
| 1 | | | 1 | | |
| | 1 | | 1 | 1 | |
| | | 1 | 1 | 1 | 1 |

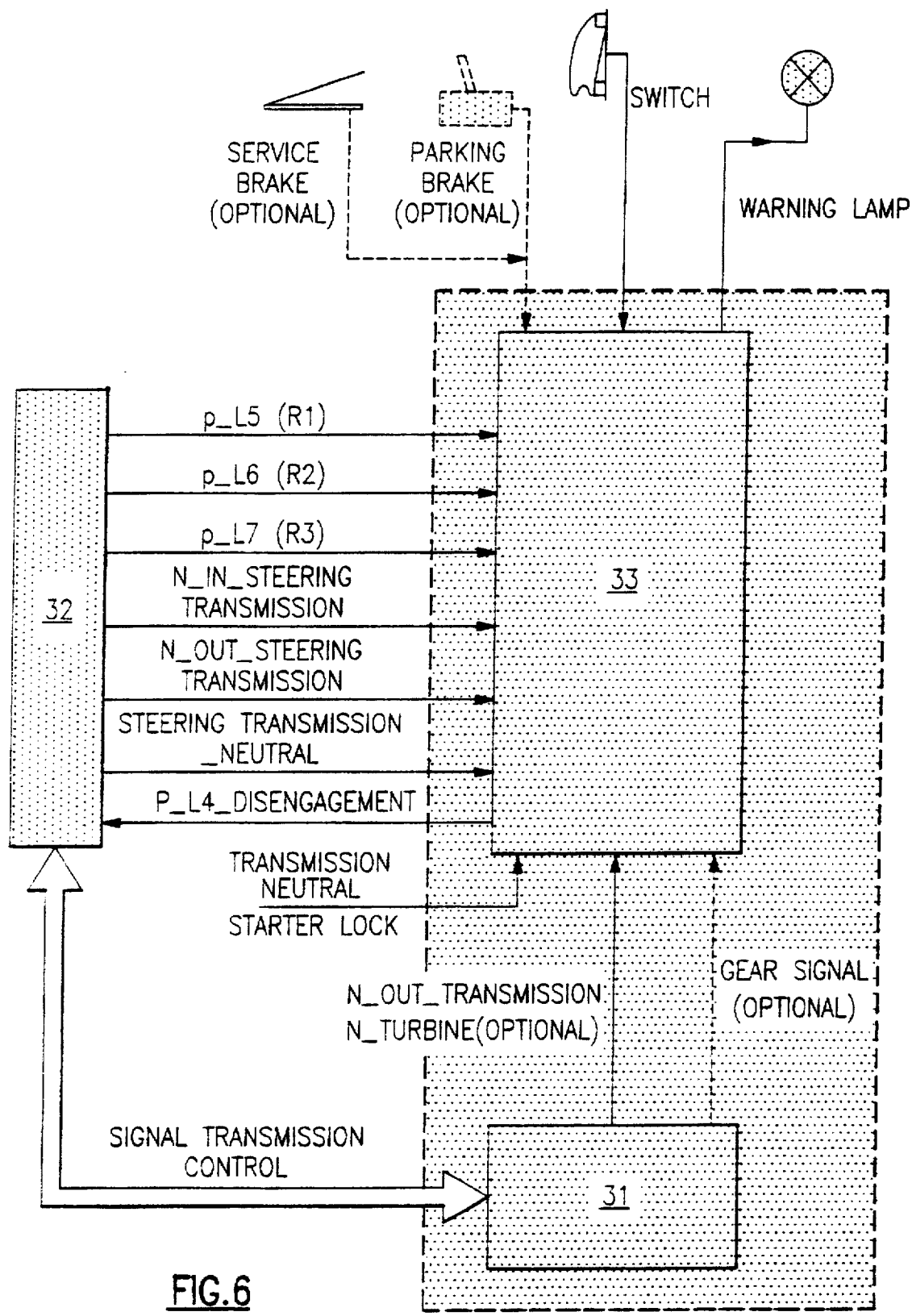

PROTECTION DEVICE FOR A STEERING TRANSMISSION OF A TRACKED VEHICLE

BACKGROUND OF THE INVENTION

The invention concerns a cross-drive steering transmission for a tracked vehicle with planetary gear sets, brake and coupling means for engaging different ratios for cornering with different radii of curve.

The cross-drive steering transmissions have become widely used for steering tracked vehicles because of safety when driving at high speeds on streets and because of small steering losses in cross-country driving. DE-A 19 055 has disclosed a cross-drive Steering transmission having three radius ranges. Said cross-drive steering transmission is composed of a hydrostatic and a mechanical partial transmission. A neutral shaft of the steering transmission interacts with summarizing transmissions of a main transmission. Exclusively, the hydrostatic partial transmission acts in a first radius range and the mechanical partial transmission acts in a second radius range. Additionally, the mechanical partial transmission acts exclusively in a third, firm radius.

Steering transmissions for tracked vehicles have the essential disadvantage that they can become overloaded under certain driving conditions as a result of operating errors or abnormal driving resistances.

A small speed difference between a track inside and outside of the curve is absolutely required for cornering with large radii of curve. A low transmission output speed of the steering transmission needed for this is obtained by a large ratio between an input (engine speed) and an output of the steering transmission. Said large ratio, however, not only provides the desired lower output speed but also produces a very high excess torque on the output shafts of the main transmission. The above described conditions cause the essential danger of overloading said steering transmission, since excessively supplied torque is never demanded by the vehicle during its normal use. But under certain conditions, a high output torque can be favored, for example, in case of operating errors (such as turning around a vertical axis with a parking brake engaged) or abnormal driving resistances (such as a drive assembly being blocked by foreign bodies).

Since for reasons of economy no transmission can be designed for said eventually occurring torques, a danger exists that a steering transmission can be destroyed as a result of slipping clutches in the steering transmission.

SUMMARY OF THE INVENTION

This invention is based on the problem of providing a protection device for a steering transmission which reliably protects the mechanical cross-drive steering transmission in case of overloading.

The problem on which the invention is based is solved by the fact that the input speed, the output speed of the steering transmission and the ratios engaged in the steering transmission are detected and compared with predetermined operating parameters, and that when slippage is detected, the steering transmission is disengaged. The proposed solution makes possible, in case of overload, a reliable protection of the mechanical cross-drive steering transmission without affecting the mobility and driving safety of the vehicle and personnel thereof. The conditions for a disengagement are selected so that, in principle, the disengagement of the steering transmission occurs only under driving conditions that theoretically make an overload possible. In addition, the disengagement occurs only when starting or at very low speeds.

A simple solution for disengaging the steering transmission consists of interrupting a supply of pressure to the steering transmission when slippage is detected.

It is very advantageous to determine a disengagement conditions by a logical combination of different operating parameters. Said operating parameters comprise the following input signals: an engaged gear, a vehicle speed, an engaged ratio in the steering transmission and a comparison of the input and output speeds of the steering transmission.

It is advantageous to add an input signal from a braking signal to the operating parameters. By using the braking signal, it is possible in certain driving manoeuvres to immediately disengage the steering transmission without waiting for slippage of the clutches. This can be the case, for example, in the driving manoeuvre of "turning around the vertical axis" with the parking brake actuated.

The disengagement of the steering transmission can be discontinued in an especially simple manner by detecting the positions of a driving switch, or change-gear handle, and the steering wheel. Said signals are linked by an AND function. As soon as the steering wheel is returned to a straight-ahead position, the disengagement of the steering transmission is discontinued.

To rule out that individual pressure-switch signals, which indicate the engaged ratios in the steering transmission, appear in arbitrary combinations, it is advantageous to test for plausibility of the pressure-switch signals.

In a preferred embodiment of the proposed solution, the protection device of the steering transmission is comprised of three functional blocks. These are formed by an electronic transmission control, a functional block of the steering transmission and a computer unit.

It is advantageous to visually indicate to a driver the disengagement of the steering transmission. A warning lamp is provided for this purpose.

Other features essential to the invention and the advantages resulting therefrom are to be understood from the description that follows of an embodiment of the invention. In the drawings:

BRIEF DESCRIPTION OF THE DRAWINGS

FIG. 4 is a functional table for illustrating the disengagement conditions;

FIG. 5 is a table for detecting errors of pressure switches; and

FIG. 6 is a diagrammatic reproduction of the functional blocks of the steering transmission protection device with a functional chart.

DESCRIPTION OF THE PREFERRED EMBODIMENT

Figures 1, 2, 3:
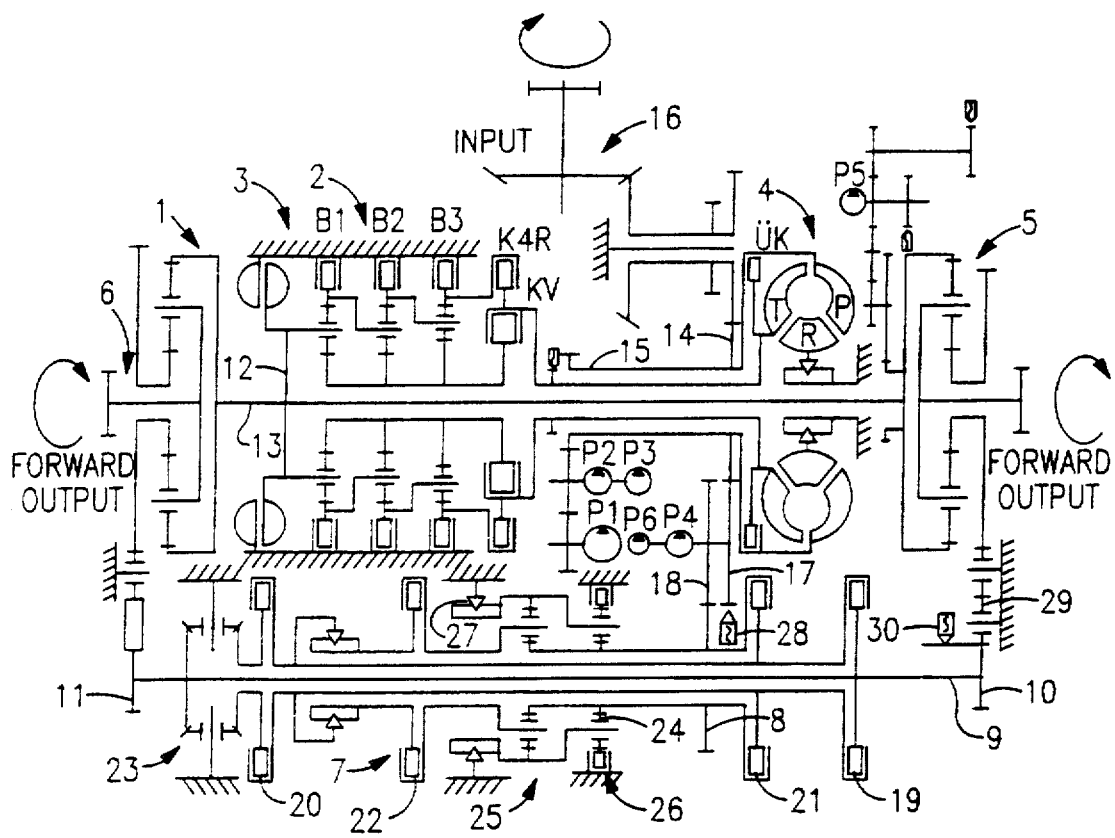
FIG. 1 is a transmission diagram of an automatic steering transmission for tracked vehicles.
FIG. 2 is a table for a gearshift transmission.
FIG. 3 is a table for the steering transmission.

FIG. 1 shows the transmission diagram of an automatic steering transmission 1 for a tracked vehicle. Said steering transmission is composed of the following modules: a gearshift transmission 2, a flow brake (retarder) 3, a hydrodynamic converter 4 and—lying respectively to the right and to the left on the drawing—summarizing transmissions 5 and 6. Beneath said assembly is shown a steering transmission 7 having an input pinion 8 and a neutral shaft 9 engaged by gears 10 and 11 to the summarizing transmissions 5 and 6.

The gearshift transmission 2 has on an input side two concentrically situated clutches KV and K4R. This is followed by three planetary gear sets, the hollow gears of which are connectable by brakes B3, B2 and B1 with a housing. A web 12 of the third planetary gear set is nonrotatably connected with a central shaft 13. The summarizing transmissions 5 and 6 are driven by the central shaft 13. Input tracks of the tracked vehicle, themselves not shown, are driven by said transmissions.

A gear 14 non-rotatably situated upon a hollow shaft 15 of the input 16 for the steering transmission 1 is in meshed engagement with an input gear 17 of the steering transmission 7. Another gear 18 creates a driving connection to the gear 8.

The steering transmission 7 has at its disposal a total of four clutches 19, 20, 21 and 22. When driving straight ahead, the clutches 19 and 20 are engaged. If the clutch 19 is disengaged, the tracked vehicle makes a right turn and if the clutch 19 is engaged and the clutch 20 disengaged, the vehicle makes a left turn. A transmission 23 for reversing the direction of rotation is situated between the clutch 20 and the gear 11.

The steering transmission 7 is completed by two planetary year sets 24 and 25. A large central gear of the planetary gear set 24 is connectable with the housing by a brake 26. A hollow gear of the planetary gear set 25 rests on the housing via a free wheel.

The tables according to FIG. 2 and FIG. 3 show respectively to which gears and at which radii the gearshifting elements are actuated.

To protect the steering transmission 7, the input speed n_in-steer is detected by means of a speed sensor 28. In addition the output speed n_out-steer is measured on an intermediate wheel 29 between the gear 10 of the neutral shaft 9 and the summarizing transmission 5. Another speed sensor 30 is provided for this purpose.

Said transmission elements between the first (firm) radius and the third radius are monitored for occurring slippage by pressure switches, themselves not shown, on the clutches 21 and 22 and on the brake 26 according to the ratios engaged in the steering transmission 7. When a slippage is detected, a solenoid valve—likewise not shown—is actuated which interrupts the supply of pressure, and therewith the transmission of torque, to the steering transmission 7.

The disengagement conditions are selected so that
1. the steering transmission disengages only under conditions in which an overload can also theoretically occur and
2. the steering transmission disengages only when starting or at very low speeds.

The disengagement conditions are to be individually understood from the table of FIG. 4.

The following input parameters are preferably monitored and combined according to logical theoretical principles: engaged gear, diverging from a neutral position N (optional gear signal), vehicle speed: v_vehicle<a maximum value of vehicle speed: vehicle_threshold, radius pressures: p_steering transm. (Pressure switches on the clutch 22, the brake 24 and the clutch 21.)

The radius pressures are designated by p_steering transm. L5, L6 and L7.

A comparison of the input speeds n_in-steering transm. with the output speeds n_out-steering transm. is also effected. The output speeds are multiplied by the ratios of the individual curve radii I_R1_g, I_R2_g and I_R3_g.

The disengagement condition is determined by a plurality of signal based conditions which are linked by a logical AND function wherein the engage gear condition is true when the engage gear input signal is diverging from a neutral position, "engaged gear<>N"; the vehicle speed condition is true, when the vehicle speed signal is smaller than a predetermined limiting value, "v_vehicle<v_vehicle threshold"; the slippage condition is true when the input speed signal of the steering transmission is greater than the output speed signal of the steering transmission multiplied by the engaged ratio of the steering transmission, "n_in_steering_transmission>n_out_steering_transmission*i_Rx_g" which is determined by a logical combination of the pressure switch signals p_L5, p_L6, p_L7. From this it follows that the steering transmission 7 is not disengaged until all conditions are present. The table also shows the optional possibility of adding to the input signals the braking signal "brake". The advantage being that in some driving manoeuvres, such as "turning around the vertical axis" with the parking brake actuated, the steering transmission 7 is disengaged immediately after actuating the steering. In this case, it does not wait until one of the clutches or the brake slips.

The disengagement of the Steering transmission 7 is discontinued as soon as the steering wheel is returned to a straight-ahead position. For this purpose, the position of the driving switch (change-gear handle) and the position of the steering wheel are detected and combined by an AND function.

It has proved very advantageous to perfect the described protection of the steering transmission 7 by additional plausibility tests. An example of this is an error detection for the pressure switches. The table of FIG. 5 expresses that the individual pressure switch signals p_L5, p_L6 and p_L7 cannot appear in arbitrary combinations.

The essential interaction of the individual functional blocks of the electronic protection device of the steering transmission is described in the function chart of FIG. 6. In essence, three functional blocks interact: one electronics control 31 for the steering gearshift transmission 1, one functional block 32 of the steering transmission 7 which delivers the radial pressures p_L5, p_L6 and p_L7. The input and output speeds and the neutral position of the steering transmission are also detected. Said signals are fed to an electronics control 33. The signals for transmission control are interchanged between the electronic transmission control 31 and the functional block 32. The electronic transmission control 31 delivers the output speed n_out-transm. to the computer unit 33. The gear signal can be optionally used. The speed of a turbine could be processed instead of the transmission output speed.

The "brake" signals (parking and/or operating brake) are optionally inputted to the electronics control 33. The driving state "stand-by" is set by a switch.

The central electronics control 33 processes the input signals according to the logical rules shown. To disengage the steering transmission 7, it delivers a disengagement signal p_L4-disengagement to the functional block 32. The solenoid valve is actuated, which interrupts the supply of pressure to the steering transmission and thus the torque transmission to the steering transmission is controlled.

The disengagement of the steering transmission is visually indicated to the driver via a warning lamp.

The protection device of the steering transmission 7 proposed by the invention advantageously stands out by the following properties:

For reasons of safety, the detection of slippage is engaged only during the "stand-by" driving conditions when in theory overloading can occur. (curve radii<s/2; s=track width of the vehicle)

The steering transmission is disengaged either during standstill of the vehicle or at very low speeds thereof.

The radii detection<s/2 is derived only from the vehicle speed (the curve outer and inner output speeds are normally needed).

The reaction upon an overload is the disengagement of the steering transmission by interrupting the supply of pressure.

The torque of the steering transmission is relieved by interrupting the supply of pressure of the steering transmission.

The disengaging valve is integrated into the filter housing of the supply of pressure of the steering transmission.

The overload of the steering transmission is sensed by detection of slippage between the input and output speeds of the steering transmission.

By the detection of slippage of the steering transmission, it is possible to utilize the maximum capacity for torque transmission of the steering transmission without taking into consideration safety factors in the form of torque tolerances. (Unlike torque sensors which must be adjusted in a way such that a torque limitation has to be released prior to reaching the slippage limit).

The disengagement is discontinued by returning the steering wheel to the straight-ahead position.

Because of the possibility of disengaging the steering transmission when overloaded, it is also possible, without added expense, to disengage (safety) the steering transmission to a neutral position of the speed-range selector (driving transmission).

A diagnosis of the pressure switches is possible by the plausibility tests of the pressure switch signals and the input and output speeds.

The disengagement of the steering transmission is indicated to the driver by a warning lamp.

The disengagement device can be deactivated by a short-circuit switch in case of interference.

A possibility of a relatively simple re-assembly of the transmission on the steering-transmission protection device.

The electronics control can be either integrated in the existing electronic transmission control or mounted firmly on the transmission (in the second case no re-assembly expense for the vehicle).

The pressure switches used for detecting the ratio engaged in the steering transmission are simultaneously used for influencing a driving program (double function).

The protection device is integrated into the transmission or in the transmission control, that is, no interference to other vehicle assemblies are needed.

| Reference numerals | | | |
|---|---|---|---|
| 1 | steering gearshift transmission | 18 | gear |
| 2 | gearshift transmission | 19 | clutch |
| 3 | flow brake | 20 | clutch |
| 4 | hydrodynamic converter | 21 | clutch |
| 5 | summarizing transmission | 22 | clutch |
| 6 | summarizing transmission | 23 | transmission |
| 7 | steering transmission | 24 | planetary gear set |
| 8 | input gear | 25 | planetary gear set |
| 9 | neutral shaft | 26 | brake |
| 10 | gear | 27 | free wheel |
| 11 | gear | 28 | speed sensor |
| 12 | web | 29 | intermediate wheel |
| 13 | central shaft | 30 | speed sensor |
| 14 | gear | 31 | electronics control |
| 15 | hollow shaft | 32 | functional block |
| 16 | input | 33 | electronics control |
| 17 | input gear | | |

We claim:

1. A cross-driving steering transmission for a tracked vehicle having a plurality of planetary gear sets, and a braking means and a coupling means for engaging different ratios for cornering with differing curve radii, comprising:

an input speed detection component for detecting input speed of the steering transmission;

an output speed detection component for detecting output speed of the steering transmission;

an engaged ratio detection component for detecting engaged ratios in the steering transmission;

a comparison component being coupled to the input speed detection component, output speed detection component and engaged ratio detection component for comparing the input speed, output speed and engaged ratio to a disengagement condition such that slippage can be detected; and a disengagement component being coupled to the comparison component for disengaging the steering transmission when slippage is detected.

2. A cross-drive steering transmission as claimed in claim 1, wherein the disengagement component interrupts pressure supplied to the steering transmission when slippage is detected.

3. A cross-drive steering transmission as claimed in claim 1, in which the engaged ratios detection component comprises:

a plurality of pressure switches on the braking and coupling means to detect and signal pressure.

4. A cross-drive steering transmission as claimed in claim 3, wherein the comparison component tests for pressure switch plausibility such that the pressure switch signals are prevented from appearing in arbitrary combinations.

5. A cross-drive steering transmission according to claim 1, wherein the disengagement of the steering transmission is visually indicated to a driver.

6. A cross drive steering transmission as claimed in claim 1, wherein the disengagement condition is determined by a plurality of signal based conditions which are linked by a logical AND function, and said signal based conditions comprise:

an engaged ratio condition is true when the detected engaged ratio diverges from a neutral position;

a vehicle speed condition is true when a detected vehicle speed signal is less than a predetermined limiting value; and said slippage condition is true when the detected input speed of the steering transmission is greater than the detected output speed of the steering transmission multiplied by the engaged ratio of the steering transmission, with the engaged ratio being determined by pressure switch signals.

7. A cross drive steering transmission as claimed in claim 6, the cross drive steering transmission has a further signal based condition which comprises a braking condition, and said braking condition is true when said brake signal is "ON".

8. A cross drive steering transmission as claimed in claim 7, wherein the disengagement of the steering transmission is deactivated as soon as a steering wheel, coupled to the steering transmission, is returned to substantially a straight ahead travel position.

* * * * *